Nov. 27, 1951  A. R. BONE  2,576,211
TAG NOTCHING MACHINE
Filed Oct. 22, 1948  3 Sheets-Sheet 1
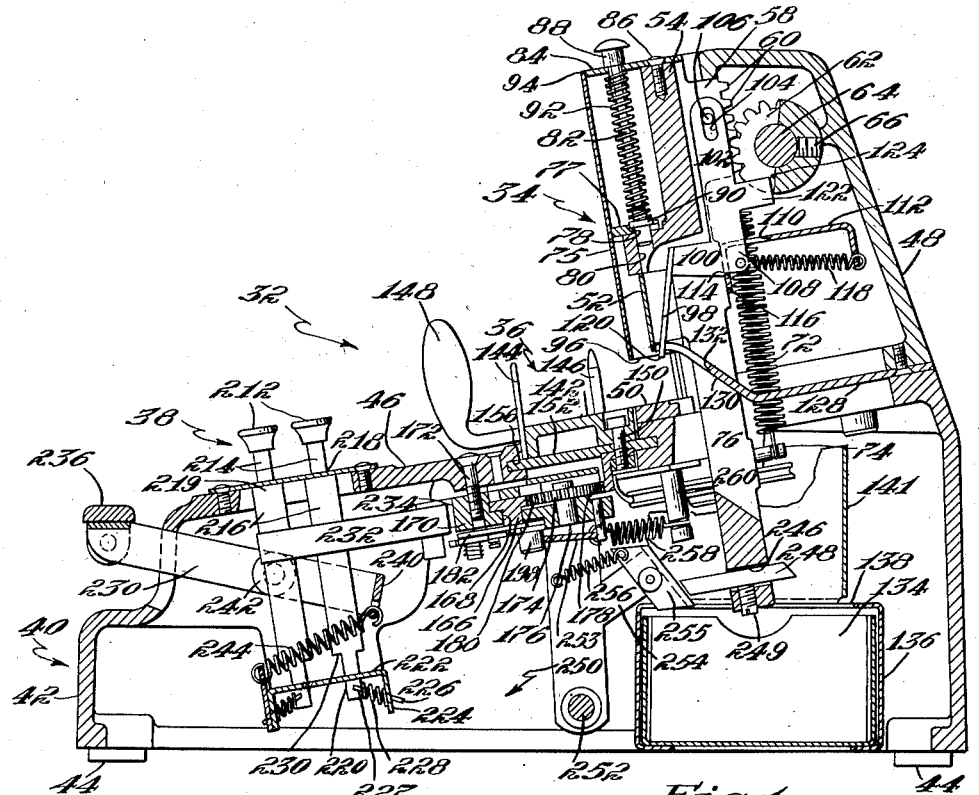
Fig. 1
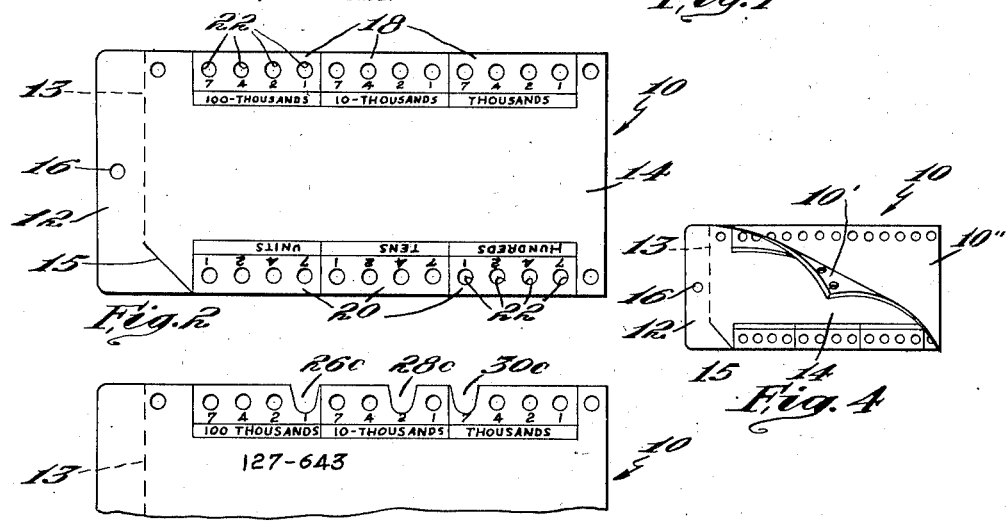
Fig. 2
Fig. 4
Fig. 3
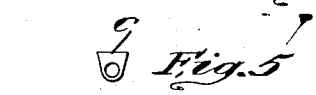
Fig. 5
Inventor
Arnold R. Bone
By Roberts, Cushman & Grover
Att'ys Nov. 27, 1951     A. R. BONE     2,576,211
TAG NOTCHING MACHINE Filed Oct. 22, 1948     3 Sheets-Sheet 2

Inventor
Arnold R. Bone
by Roberts, Cushman & Grover
Att'ys.

Nov. 27, 1951  A. R. BONE  2,576,211
TAG NOTCHING MACHINE
Filed Oct. 22, 1948  3 Sheets-Sheet 3

Inventor
Arnold R. Bone
by Roberts, Cushman & Grover
Attys.

Patented Nov. 27, 1951

2,576,211

UNITED STATES PATENT OFFICE 2,576,211

TAG NOTCHING MACHINE

Arnold R. Bone, Needham, Mass., assignor to Dennison Manufacturing Company, Framingham, Mass., a corporation of Massachusetts Application October 22, 1948, Serial No. 55,975

7 Claims. (Cl. 164—112)

This invention relates to machines for cutting notches in tags such as are conventionally employed for recording the quantity, kind, style or price of items of merchandise carried in stock at any given time, and has for its principal objects to provide an easily operated machine wherein the tags to be notched are visible during the entire time of notching so that the operator can see exactly where the notches will be made prior to the cutting operation, wherein one or more tags may be notched at the same time and the tags are reversible so as to receive notches along one or both edges, wherein the notching is controlled by key-operated elements so arranged that the notches formed in the tags will be in the same order as the keys in the keyboard, wherein if an error was made in setting up the composition by punching a wrong key the entire key-operated mechanism may be cleared and reset to correct the error without spoiling the tags in the machine, and preferably wherein the order of the keys and the formation of the notches in the tags are from left to right as is consistent with the conventional English system of copy.

As illustrated the machine has a movable carriage support for tags to be notched, a single cutter reciprocable to and from the carriage for cutting notches along the edges of the tags, keys and key controlled elements movable into controlling position relative to the carriage to control movement thereof relative to the cutter thereby to space the notches along the edges of the tags according to the predetermined composition. The carriage is adapted to support one or more tags in stacked relation and in reverse end-for-end position so that one or both edges may be notched, and is movable in one direction during notching by a spring motor. A lever provides means for moving it in the opposite direction to reset it.

The foregoing key controlled elements comprise a plurality of stops interposable into the path of the carriage by corresponding keys to control the movement of the carriage, the latter being released for movement from one stop to the next by actuation of the cutter. So that the digit value of the keys will bear the same relation to the observed face of the tag being notched as the notches that are cut therein, the carriage has associated therewith latch means situated to be engaged by one of the stops at a time to hold the carriage in a position such that a tag carried thereby will receive a cut in its edge corresponding to the digit value of the stop with which the latch is engaged. Actuation of the cutter is effective to release the latch whereupon the motor moves the carriage transversely until the latch engages the succeeding stop of lower digit value whereupon it is arrested until the cutter is again actuated.

The construction and operation of the machine will now be described in greater detail with reference to the accompanying drawings wherein:

Fig. 1 is a vertical elevation in section taken substantially midway between the opposite ends of the machine;

Fig. 2 is a plan view of a tag of the type which is to be notched by use of the machine;

Fig. 3 is a fragmentary portion of the tag showing notches cut in one edge thereof;

Fig. 4 is an isometric view of a tag showing it as consisting of two plies attached to a stub;

Fig. 5 is a plan view of a chip removed from its notch;

Figure 6:
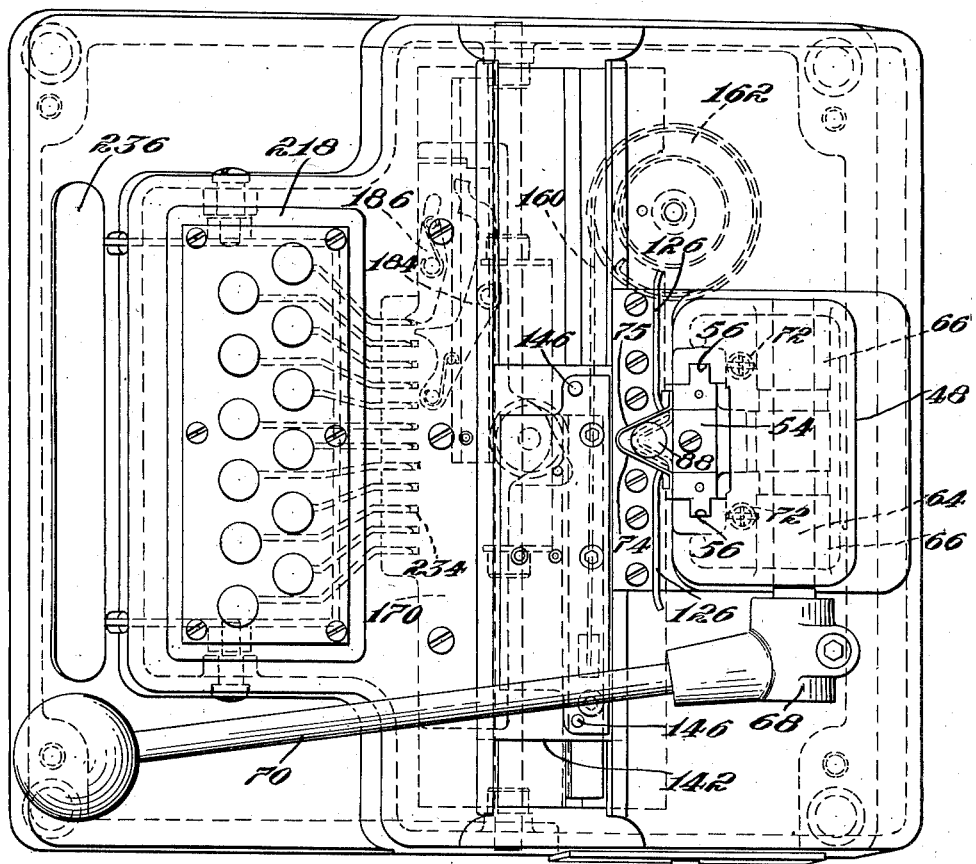
Fig. 6 is a plan view looking down on top of the machine.

The present machine is for the purpose of cutting notches in the edge of tags such as are commonly used by wholesalers and retailers to record data which is pertinent to stocktaking and inventories. A tag 10 of the type shown in Fig. 2 is shown by way of illustration and is comprised of two plies 10' and 10'' (Fig. 4) which are superposed and are divided into stub portions 12 and body portions 14, the latter being removable from the stubs along weakened tear lines 13 and 15. A small hole 16 midway between the opposite edges of the stubs provides for holding the tag in place on the machine, as will appear hereinafter, and also for attaching the tags to the merchandise. Along opposite margins of the tags (Fig. 2) are indicia-marked areas 18 and 20, each of which is divided into three groups defined by printed demarcation lines. Within each area there are four holes 22 punched through the tag, and these holes are marked from left to right, as seen in Fig. 2, with the numerals 7, 4, 2, 1, and on the opposite margin from right to left 7, 4, 2, 1. The first group on the top margin, as seen in Fig. 2, represents hundred-thousandths, the second group ten-thousandths, and the third group thousandths. The groups in the lower margin are marked respectively hundredths, tens and units. In cutting the notches in a tag of this type to record, for example, certain styles, quantity, quality, price, etc., a particular number is selected to represent what is desired and this number is punched in an edge or edges of the tag by cutting through the tag to remove chips or pods C (Fig. 5), which are substantially triangular in shape. To illustrate, suppose the number to be recorded is 127–643 (Fig. 3). The first three numbers 1–2–7 represent 127 thousand and would be recorded by cutting a notch opposite 1 in the first group (designated 26c), a notch opposite the number 2 in the second group (designated 28c) and a notch opposite the number 7 in the third group (designated 30c). The tag would then be reversed, that is, turned end for end and notches corresponding to the numbers 6, 4 and 3 cut in the opposite edge. Since there is no key having a digit value of 6 on the machine, this number would be made up by cutting notches opposite the figures 4 and 2. In the same way the number 3 would be made up by cutting notches opposite 2 and 1.

The machine 32 for cutting notches in tags of the type described above is shown in Fig. 1 as comprised essentially of a cutter head 34, a tag carriage 36 arranged to present an edge of the tag to the cutter, and a keyboard 38 for selectively positioning the tag-carrying carriage with respect to the cutter, these being assembled in operating relation to each other, as will appear hereinafter, on a base 40.

The base 40 is in the form of a hollow, substantially rectangular frame 42 supported at its four corners on cushions 44 and has at its top side an inclined table 46 which contains the keyboard 38, the tag carriage 36 and an upstanding turret 48 at the rear portion thereof which houses the cutter head 34.

The turret 48 is preferably separable from the frame and is attached thereto at its base by suitable screws. At the forward side of the turret there is mounted a cutter and cutter head which move substantially vertically with respect to the inclined surfaces of the table 46 and cooperate with a cutter block 50 formed integral with the frame. The cutter blade 52 is substantially V-shaped, the apex of the cutter, however, being rounded off so as not to be acutely angular thereby affording a continuous and clean cut. The cutter is fastened to a cutter head 54 which is slidably received in an open channel 55 (Fig. 6) formed in the forward side of the turret in the walls of which are a pair of opposed ways or grooves 56. To impart vertical movement to the cutter head and hence to the cutter, to and from the cutter block there is formed integral with the back side of the cutter head a rack 58 (Fig. 1) having rack teeth 60 which mesh with a pinion 62 fastened to a horizontal, transversely extending shaft 64 by a set screw 66. Rotation of the shaft 64 is effected by a hand lever or arm 70 (Fig. 6) which is attached to one end of the shaft 64 by means of a clamp collar 68. Manual depression of the lever 70 is necessary to move the cutter down toward the cutter block and hence through the tag or tags resting on the cutter block. The cutter is returned, however, to a position of rest by a pair of stiff springs 72, the lower ends of which are connected to posts 74 extending laterally from a depending extension 76 projecting downwardly from the cutter head.

Figure 10:
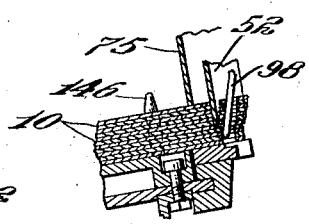
Fig. 10 is a fragmentary view showing the presser foot resting on the topmost tag of a stack of tags, the cutter penetrating part of the stack, and the chip remover.

In order to hold the tag or tags while the cutter is penetrating the same to make the cut and also to prevent the tags from lifting away from the cutter block as the cutter is being retracted, a presser foot 75 (Figs. 1 and 10) is provided which is a substantially V-shaped channel and is arranged to straddle the cutter. The edges of the presser foot have bordering flanges which bear against the flat face of the cutter head at opposite sides of the channel 55 and a web 77 substantially midway between its ends which rests on a shoulder portion of the cutter head and is yieldably held thereagainst by a rod 82, the lower end of which passes through a hole 78 in the web and into an aperture 80 formed in the shoulder portion. The upper end of the rod passes through a plate 84 fastened by means of screws 86 to the top of the cutter head. A coil spring 92 placed on the rod between the plate 84 and a collar 90 formed on the lower end of the rod yieldably forces the presser foot in a downward direction. A head 88 at the upper end of the rod provides for lifting it so as to permit removing the presser foot when it is desired to have access to the cutter knife. As thus mounted the lower edge 96 of the presser foot is slightly in advance of the cutting edge of the cutter so that it will come into engagement with the tags to be cut prior to movement of the cutter knife into engagement therewih and will remain in contact with the tags until the cutter moves out of contact with the tags.

Each time the cutter 52 is brought into operation it cuts from an edge of each tag a pod or small chip C (Fig. 5) and if these chips accumulate without being removed from the vicinity of the operating parts, they quickly foul the parts to such an extent that they become jammed and will not perform their proper operations and also impede cutting or making clean cuts through the tag. Accordingly, a pod or chip remover 98 (Figs. 1 and 10) is provided which is in the form of a slender finger mounted so that it is close to the cutter and arranged to enter that portion of the tag which is cut and move it out of the notch immediately upon penetration of the cutter through the tag, propelling it to an out-of-the-way position. The construction and operation of the pod or chip remover 98 forms the subject matter of a divisional application to which reference may be had for a complete description thereof.

The tag-carrying carriage 36 is in the form of a flat plate 142 arranged to move transversely of the cutter and has at its forward edge a vertical curb 144 and at its opposite ends upright pins 146, the distance between the rear or inner surface of the curb 144 and a plane passing through the vertical axes of the pins 146 being substantially equal to one-half of the width of a tag to be notched. Thus tags placed on the carriage will be held firmly in place by engagement of one longitudinal edge with the curb and one end with one of the pins. The distance from the plane passing through the vertical axes of the pins 146 to the rear edge of the plate 142 is less than one-half the width of a tag so that a marginal edge of the tag will project over the edge of the plate onto the cutter block 50. This edge, as indicated above, will engage the spaced guides 126. It is to be observed that the upper surface of the plate 142 and the cutter block 50 are in the same plane.

The plate 142, hereinafter called the carriage, moves transversely of the machine relative to the cutter 152 and is moved in one direction by a hand lever 148 fastened to the left end thereof and in the opposite direction by a motor which will be described hereinafter. Attached to the bottom of the carriage 142 by bolts 150 is a slide plate 152 and an angle bar 154. The opposite edges of the slide plate are situated in ways 156 formed in the table portion of the frame. The motor for traversing the carriage in a direction from right to left is constituted by a bracket 158 (Fig. 8) fastened to one end of the angle bar 154, a clock spring 162 fixed to a post 164 within the base, and a cord 162 fastened at one end to the bracket and at its opposite end to the clock spring.

Figure 8:
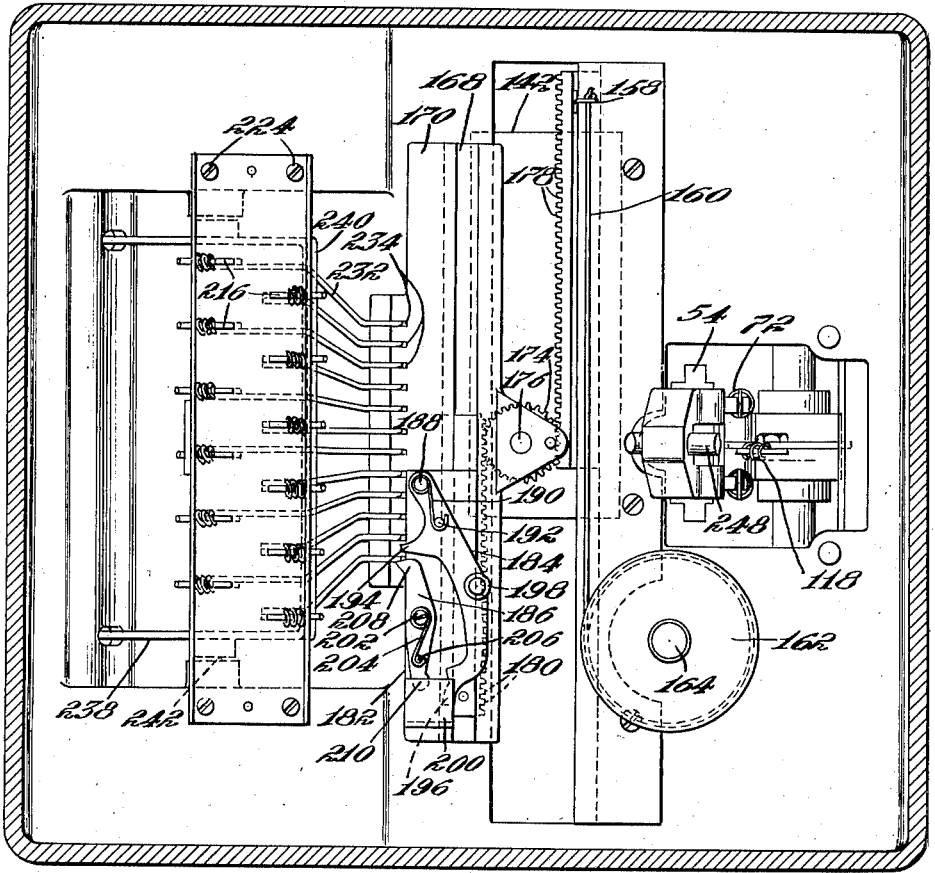
Fig. 8 is a bottom view of the machine looking up from beneath.
Figure 9:
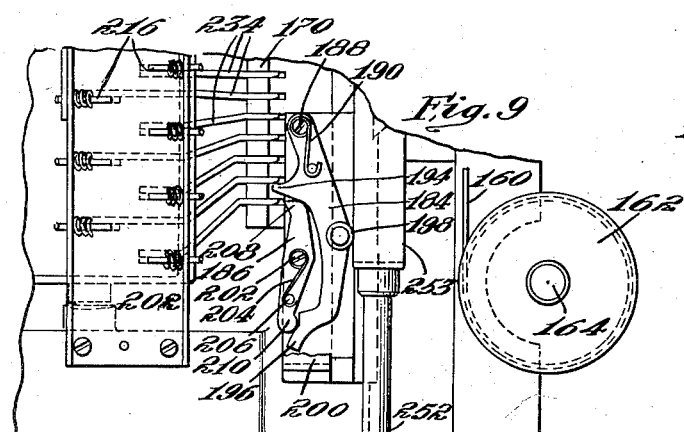
Fig. 9 is a fragmentary portion of the escapement mechanism as seen from the bottom.

Movement of the carriage uner the influence of the spring motor is controlled by escapement mechanism so as to cut notches at selected points in the edge of the tag, as will now be described. A slide bar 166 is slidably mounted in a slot 168 cut in a block 170 which is fastened to the under side of the table by bolts 172. Between the slide bar 166 and the angle bar 154 there is placed a pinion gear 174 the latter being mounted on a stud 176 which is set into the block 170 and which meshes with rack teeth 178 and 180 formed on opposed faces of the angle bar 154 and the slide bar 166 respectively. Consequently movement of the carriage in one direction will impart movement of the slide bar in the opposite direction. The arrangement of the carriage and the slide bar which supports the escapement mechanism to move in opposite directions has an important aspect which will appear hereinafter. The slide bar supports and carries the escapement mechanism which, as shown in Figs. 8 and 9, is comprised of two interacting latches 184 and 186. The latch 184 is pivotally attached at 188 to a plate 182 fixed to the slide bar and an S-shaped spring 190 fixed to the pivot 188 and to a pin 192 set into the latch which urges the latch to turn in a counterclockwise direction, as seen in Figs. 8 and 9. The latch has on its left side, as seen in Figs. 8 and 9, a finger 194 and at its free end a second finger 196. Midway between the fingers 194 and 196 there is pivotally attached to the latch a cam roll 198. Movement of the latch 184 in a counterclockwise direction is limited by a stop 200 fixed to the plate 182. The latch 186 is pivotally attached to the plate 182 at 202 and an S-shaped spring 204 fixed to the pivot and engaged with a pin 206 urges the latch in a counterclockwise direction. This latch has a forward end 208 and a rear end 210. Operation of the escapement mechanism will be related hereinafter.

Figure 7:
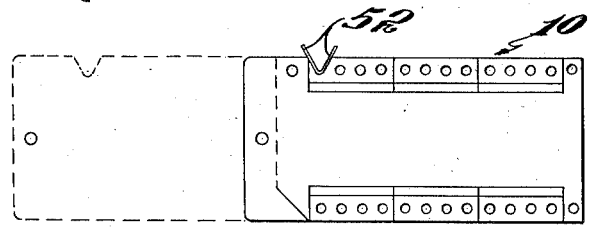
Fig. 7 is a diagrammatic view in plan of the movement of a tag from the extreme right-hand position to the extreme left-hand position of the machine and illustrating the relation of the notches cut therein to the keys.

As heretofore indicated, the machine is key-operated and is provided for this purpose with a plurality of keys 212 (Figs. 6 and 7) which are arranged in two rows transversely of the machine and in three groups of four so that there are twelve keys in all. As illustrated in Fig. 7, the first four starting at the left side are numbered 7, 4, 2, 1. The second and third groups are similarly numbered. Each key is connected by a stem 214 (Fig. 1) which rises from a narrow plate 216 situated in the base of the machine; the stem projecting through a slot formed in a cover plate 218 attached to the sloping table of the machine and the junction between the stem and narrow plate forms a shoulder 219 which bears against the under side of the plate, thereby limiting the upper position of the key. The lower end of each narrow plate 216 is necked down at 220 and projects through a slot formed in a U-shaped bracket 222 fastened transversely of the machine in the base. The U-shaped bracket has downwardly extending flanges 224 and between the flange and each necked portion 220 of a plate there is placed a short bar 226 having a head 227. The head of the bar is slotted to embrace the edge of the necked portion and the other end projects through a hole in the flange. A stiff spring 228 is mounted on the bar between its head and the flange and holds the narrow plate in an up position with the shoulder 219 engaged with the under side of the plate 218 or in a down position with the shoulder 230 formed between the necked portion 220 and the plate 226 engaged with the top of the U-shaped bracket 222. Each plate 216 has fastened thereto a rearwardly extending arm 232 which when the key is in an up position projects into a slot 234 formed in the block 170 just above the plane of the top surfaces of the latches 184 and 186. When a key is depressed to its lower position, the arm 232 will move downwardly so that its end portion will lie in the path of the latches 184 and 186. If for any reason the wrong keys are inadvertently depressed, all of the keys may be returned to their inoperative position by a clearing bar 236. As illustrated, the clearing bar is situated at the front of the machine and has attached to its opposite ends legs 238 of a U-shaped member which pass through the front wall of the frame and are pivotally supported on studs 242 extending from opposite inner side walls. The transverse portion 240 of the U-shaped member is situated beneath the under side of the arms 232 and by pressing down on the clearing bar may be raised to engage and lift all of the keys to the up position. A spring 244 holds the clearing bar 236 in an inoperative position when not in use.

When it is desired to notch a tag or tags, it being understood that one or more tags may be notched at a time and which for convenience will be related as one tag hereinafter, with notches 1-2-7 for example as shown in Fig. 3, the tag is placed on the carriage with the hole 16 over the appropriate pin 146, the keys 212 (Fig. 7) representing 1 in the first group, 2 in the second group, and 7 in the third group will be depressed, the handle 148 is grasped and the carriage is pushed to the right as far as it will go and then released. The machine is then in readiness for cutting the aforesaid notches. To bring about cutting, the lever 70 is then grasped and is depressed which effects actuation of the escapement mechanism as follows. At the lower end of the extension 76 (Fig. 1) there is formed a transverse slot 246 through which there is inserted a short bar 248, the latter being fixed therein by a set screw 249. A bail 250 is pivotally mounted on a transversely extending shaft 252 adjacent to the lower end of the extension 76 and has on it a rearwardly projecting limb 254 to which is pivotally attached a bar 255, the lower end of which is held in the path of movement of the bar 248 by a spring 256, the ends of which are connected respectively to one limb of the bail and to the upper end of the bar 255. Normally the bail is held in an upright position by a spring 258 connected at one end to the bight 253 of the bail and at its opposite end to a post 260 set into the under side of the table. The forward edge of the bight engages the cam 198. Consequently when the cutter head descends the bar 248 moves downwardly and in passing the bar 255 tips the bail in a counterclockwise direction, as viewed in Fig. 1, in opposition to the spring 258 so as to move the latch 184 in a clockwise direction, as seen in Figs. 8 and 9. When the latch 184 is moved in a clockwise direction, the end 196 thereof will engage the end 210 of the latch 186 and will move the forward end 208 of that latch out of engagement with the arm 232 of the key number 1 situated in the group at the left side of the machine or if this particular key was not depressed, the first key from the left which was depressed. Simultaneously the finger 194 of the latch 184 will move in between this arm and the succeeding arm of lower digit value. As a result the carriage will move toward the left but will be caught and normally interrupted in its movement by the finger 194, giving the latch 186 time to return to its latching position as the cutter is retracted so that skipping will not occur. As the cutter returns to its inoperative position the bar 248 will move by the bar 255 by pivoting in a counterclockwise direction without disturbing the position of the bail which was drawn rearwardly by the spring 253 immediately after effecting movement of the latch 184. The latch 184 is, of course, returned to its inoperative position almost immediately after its release by the spring 190 which in turn allows the latch 186 to return to its operative position under the influence of the spring 204, thereby holding the carriage at its next position. Successive cutting operations will bring about repetition of the foregoing movement of the parts. As thus constructed the notches in the tag are cut in the same relation, that is from left to right, as the keys are located so that no confusion arises in operating the machine.

When the notches have been cut in one edge of the tag or pile of tags, they are lifted from the carriage and reversed end for end and replaced whereupon the notches in the opposite end of the tag are cut.

It should be understood that the present disclosure is for the purpose of illustration only and that this invention includes all modifications and equivalents which fall within the scope of the appended claims.

I claim:

1. In a tag-notching machine a cutting station, a cutter situated at said station for movement into and out of cutting position, means for effecting cutting movement of the cutter, a tag carriage arranged to move transversely of said station to carry a tag placed thereon transversely of the cutter, a motor for moving the carriage in a given direction with respect to the station, stops arranged in increasing order of digit value in the direction of movement of the carriage and selectively positionable in an operative position, latch means associated with the carriage and engageable with said stops when in operative position one at a time to hold the carriage in a given position for cutting a notch in the tag corresponding to the digit value of that stop, and means operable by cutting movement of the cutter to disengage the latch means from the stop with which it is engaged at the time of cutting, whereupon said motor effects movement of the carriage in the direction of the increasing digit value and the latch means in the opposite direction until the latter is engaged by the next succeeding stop of lower digit value in operative position.

2. In a tag-notching machine a cutting station, a cutter situated at said station for movement into and out of cutting position, means for effecting cutting movement of the cutter, a tag carriage arranged to move transversely of said station to carry a tag placed thereon transversely of said cutter, a motor for moving the carriage in a given direction with respect to the station, stops arranged in increasing order of digit value in the direction of movement of the carriage, keys for selectively placing predetermined ones of said stops in an operative position, latch means associated with the carriage and engageable with said stops when in operative position one at a time to hold the carriage at a given position for cutting a notch in the tag corresponding to the digit value of that stop, and means operable by the movement of the cutter to disengage the latch means from the stop with which it is engaged at the time of cutting, whereupon said motor effects movement of the carriage in the direction increasing digit value and the latch means in the opposite direction until the latter is engaged by the next succeeding stop of lower digit value in operative position.

3. In a tag-notching machine a cutting station, a cutter situated at said station for movement into and out of cutting position, means for effecting cutting movement of the cutter, a tag carriage arranged to move transversely of said station to carry a tag placed thereon transversely of the cutter, a motor for moving the carriage in a given direction with respect to the station, stops arranged in increasing order of digit value in the direction of movement of the carriage and selectively positionable in an operative position, latch means associated with the carriage including a primary latch and a secondary latch, said primary latch being normally yieldably held in an operative position to engage one of the stops to hold the carriage in a given position, means operable by the cutter succeeding the cutting operation to effect disengagement of the primary latch through the intermediary of the secondary latch and simultaneously to interpose the secondary latch into an operative position to be intercepted by the succeeding stop of lower digit value, whereupon said motor effects movement of the carriage in the direction of the increasing digit value until the succeeding stop strikes said secondary latch, and means for restoring the latches to their initial positions wherein said primary latch will be in engagement with said stop of lower digit value.

4. In a tag-notching machine a cutting station, a cutter situated at said station for movement into and out of cutting position, means for effecting cutting movement of the cutter, a tag carriage arranged to move transversely of said station to carry a tag placed thereon transversely of said cutter, a motor for moving the carriage in a given direction with respect to the station, stops arranged in increasing order of digit value in the direction of movement of the carriage, said stops being selectively positionable in an operative position, retractable latch means kinematically connected thereto for movement by the carriage but in the opposite direction thereto, said latch means being engageable with said stops when in operative position one at a time to hold the carriage at a given position for cutting a notch in the tag corresponding to the digit value of that stop, means operable by the cutter to retract the latch means from engagement with the stop with which it is engaged at the time of cutting, whereupon said motor effects movement of the carriage in the direction of increasing digit value and the latch in the opposite direction, and means for returning the retracted latch to operative position for engagement with the next succeeding stop of lower digit value in operative position.

5. In a tag-notching machine a cutting station, a cutter situated at said station for movement into and out of cutting position, means for effecting cutting movement of the cutter, a tag carriage arranged to move transversely of said station to carry a tag placed thereon transversely of said cutter, a motor for moving the carriage in a given direction with respect to the station, stops arranged in increasing order of digit value in the direction of movement of the carriage, latch means kinematically connected to the carriage for movement thereby in a direction opposite thereto, keys for selectively placing said stops in operative positions, said stops when in operative position being adapted to be engaged one at a time by said latch means, means operable by the cutter momentarily to retract the latch means from a stop to permit movement thereof by the stop, whereupon said motor effects movement of the carriage in the direction of increasing digit value and the latch means in the opposite direction, and means for immediately returning the latch means to operative position to be engaged by the next succeeding stop of lower digit value in operative position to stop the carriage in a position to receive a notch corresponding to said lower digit value.

6. In a tag-notching machine a cutting station, a cutter situated at said station for movement into and out of cutting position, means for effecting cutting movement of the cutter, a tag carriage and carriage slide arranged to move transversely of said station to carry a tag placed thereon transversely of the cutter, a motor for moving the carriage slide in a given direction with respect to the station, latch means and a latch slide movable relative to said carriage slide, said carriage slide and latch slide being drivably connected so that movement of the former in one direction effects movement of the latter in the opposite direction, stops arranged in increasing order of their digit value in the direction of movement of the tag carriage, said stops being selectively interpositionable in operable position and adapted to be engaged when in operable position one at a time by said latch means, means operable by the cutter momentarily to retract the latch means on its slide from a stop thereby to release the carriage slide, whereupon the motor effects movement of the carriage slide and movement of the latch means by the stop, and means for immediately returning the latch means to operative position to be engaged by the next succeeding stop of lower digit value to stop the latch slide and hence the carriage slide at a position where the tag on the tag carriage will receive a notch corresponding to said lower digit value.

7. In a tag-notching machine a cutting station, a cutter situated at said station for movement into and out of cutting position, means for effecting cutting movement of the cutter, a tag carriage and carriage slide arranged to move in a direction to carry a tag placed thereon transversely of the cutter, a motor for moving the carriage, latch means and a latch slide movable relative to the carriage, rack teeth on opposed parts of the carriage and latch slides between which is interposed and meshes therewith a gear, a latch finger yieldably mounted on the latch slide and movable therewith in a given path, stops arranged in increasing order of their digit value in the direction of movement of the carriage, said stops being selectively interposable in operable positions and adapted to be engaged when in operable position one at a time with the latch means, means operable by the cutter to deflect said yieldable latch sufficiently to clear the stop with which it is engaged, whereupon said motor effects movement of the carriage and the latch means until the latter is engaged with the next succeeding stop of less digit value, thereby to stop the carriage in a position to receive a notch corresponding to said lower digit value.

ARNOLD R. BONE.

REFERENCES CITED

The following references are of record in the file of this patent:

UNITED STATES PATENTS

| Number | Name | Date |
| --- | --- | --- |
| 736,166 | Stimpson | Aug. 11, 1903 |
| 1,067,461 | Bradstreet | July 15, 1913 |
| 1,686,269 | Dunlap | Oct. 2, 1928 |
| 1,841,049 | Myers | Jan. 12, 1932 |
| 1,911,741 | Berry | May 30, 1933 |
| 2,041,085 | Nevin | May 19, 1936 |
| 2,170,759 | Lentine et al. | Aug. 22, 1939 |
| 2,232,652 | Broido | Feb. 18, 1941 |
| 2,267,517 | Barney | Dec. 23, 1941 |
| 2,414,547 | Nevin | Jan. 21, 1947 |
| 2,419,781 | Keefe | Apr. 29, 1947 |